(12) United States Patent
Kaiser et al.

(10) Patent No.: US 7,819,053 B2
(45) Date of Patent: Oct. 26, 2010

(54) METHOD AND SYSTEM FOR MOLDING CHOCOLATE UTILIZING AN AIR KNIFE AND PRODUCTS MADE

(75) Inventors: John M. Kaiser, Elizabethtown, PA (US); Dale R. Slesser, Elizabethtown, PA (US); Dominic M. Diperna, Elizabethtown, PA (US); Richard A. Morgan, Elizabethtown, PA (US); Rick A. Floyd, Elizabethtown, PA (US); Robert A. Parker, Elizabethtown, PA (US); Robert Harvey, Elizabethtown, PA (US)

(73) Assignee: Mars, Incorporated, McLean, VA (US)

( * ) Notice: Subject to any disclaimer, the term of this patent is extended or adjusted under 35 U.S.C. 154(b) by 1096 days.

(21) Appl. No.: 11/410,207

(22) Filed: Apr. 25, 2006

(65) Prior Publication Data
US 2007/0172565 A1 Jul. 26, 2007

Related U.S. Application Data

(60) Provisional application No. 60/761,690, filed on Jan. 23, 2006.

(51) Int. Cl.
*A23G 1/21* (2006.01)
*A23G 1/26* (2006.01)
(52) U.S. Cl. .................. 99/450.6; 99/517; 425/72.1; 425/106; 425/446; 426/293; 426/305; 426/306; 426/312

(58) Field of Classification Search ............. 425/72.1, 425/445, 446, 94, 105, 106, 232, 306; 426/293, 426/305, 307, 312; 99/450.6, 517
See application file for complete search history.

(56) References Cited

U.S. PATENT DOCUMENTS

| | | | | |
|---|---|---|---|---|
| 2,663,269 A | * | 12/1953 | Kloess | 426/515 |
| 3,572,256 A | * | 3/1971 | Westin | 425/571 |
| 3,666,388 A | | 5/1972 | Oberwelland et al. | 425/261 |
| 3,780,643 A | * | 12/1973 | Papai | 99/450.7 |
| 3,883,079 A | * | 5/1975 | Papai | 241/94 |
| 3,906,850 A | * | 9/1975 | Papai | 99/450.7 |
| 4,748,031 A | * | 5/1988 | Koppa | 426/283 |
| 4,888,192 A | * | 12/1989 | Ramnarine | 426/448 |

(Continued)

FOREIGN PATENT DOCUMENTS

DE 36 09 522 A1 9/1987

(Continued)

OTHER PUBLICATIONS

Whetstone, Hank "Moulds and Moulding: Examples and Techniques" pp. 100-106, 50*th* P.M.C.A. Production Conference, 1996.

*Primary Examiner*—Yogendra N Gupta
*Assistant Examiner*—Emmanuel S Luk
(74) *Attorney, Agent, or Firm*—Fitzpatrick, Cella, Harper & Scinto

(57) ABSTRACT

Prior to cooling, an air knife is used to remove bubbles from confectionery-filled chocolates, preferably center-filled chocolates, deposited in a mold tray, preferably using a one-shot depositor. Using the method and apparatus, it is possible to manufacture novel confectionery products, including one-shot deposited caramel-filled dark chocolates.

6 Claims, 1 Drawing Sheet

U.S. PATENT DOCUMENTS

| | | | | |
|---|---|---|---|---|
| 5,019,404 | A | * | 5/1991 | Meisner ........................ 426/249 |
| 5,306,460 | A | | 4/1994 | Hidawa et al. ............... 264/500 |
| 5,686,128 | A | * | 11/1997 | Tracy et al. .................. 426/284 |
| 5,798,131 | A | * | 8/1998 | Bertrand et al. .............. 426/293 |
| 5,814,360 | A | * | 9/1998 | McDilda et al. ................ 426/94 |
| 6,267,073 | B1 | | 7/2001 | Busse et al. .................... 118/24 |
| 7,332,189 | B2 | * | 2/2008 | Mihalos et al. ............. 426/497 |
| 2002/0015764 | A1 | * | 2/2002 | Laffont et al. ................. 426/94 |
| 2006/0233939 | A1 | * | 10/2006 | Sanders et al. .............. 426/660 |

FOREIGN PATENT DOCUMENTS

WO            00/13524            3/2000

\* cited by examiner

METHOD AND SYSTEM FOR MOLDING CHOCOLATE UTILIZING AN AIR KNIFE AND PRODUCTS MADE

This application claims the benefit of priority of U.S. provisional application No. 60/761,690, filed Jan. 23, 2006, which is incorporated by reference.

BACKGROUND OF THE INVENTION

1. Field of the Invention

The invention is in the field of molding confectionery-filled chocolate products.

2. Description of the Related Art

Molded chocolates having a center-fill material can be conventionally made using a specialized depositor known in the art as a "one-shot" depositor, which simultaneously deposits chocolate and one or more center-fill materials into individual mold cavities in a mold tray. The exposed surface of the chocolate not directly contacting the mold cavity becomes the bottom of the finished product. After the chocolate and the one or more fill materials are deposited, the molding trays are vibrated to ensure that the co-deposited materials fill the mold cavity and the exposed surface is even. Thereafter, the mold trays are transported through a cooling tunnel where they set and harden to form finished confectionery pieces, which are then removed from the tray and packaged. One-shot depositing has advantages over traditional shell molding because it is more cost effective.

Defects known to occur in connection with such codeposited (i.e., one-shot deposited) molded products include macrobubbles, microbubbles (or pinholes), bottom surface imperfections such as craters and protrusions, and leakage of the center-filling. Any of these defects appearing on a chocolate piece may constitute sufficient reason to reject a piece of confectionery in quality control.

Based upon observations of the inventors herein, defects such as macrobubbles, microbubbles and craters can generally be attributed to air in the chocolate. Macrobubbles have relatively larger size, on the order of about 1.5 mm to about 2 mm in diameter or larger, and may be caused by air being forced upward toward the exposed surface when the mold tray is vibrated. When a macrobubble pops, a surface irregularity known as a "crater" may form on the bottom surface of the product. On the other hand, pinholes typically remain at the interface of the mold and the chocolate, disfiguring the "top" surface of the product. Pinholes are smaller than macrobubbles, but nevertheless visible. Conventionally, the problem of surface irregularities in one-shot molded products has been addressed by vibrating the mold tray to settle the components into the mold cavities.

However, vibrating the trays causes other problems, as the center-fill materials make their way toward the surface of the mold cavity or toward the exposed surface of the chocolate, in some cases through the chocolate, resulting in an insufficient shell thickness, or outright leakage of center material through the chocolate. Based on observations by the inventors herein, the problem of leakage appears to be particularly acute where there is a differential in density between the center-fill material and the chocolate. Generally, the lower the yield value of the chocolate, the greater the likelihood of leakage, since it is easier for the center-fill material to move.

There has been a longstanding consumer interest in chocolate and caramel combinations. Recently, the demand for dark chocolate products has been on the rise. Accordingly, the demand for products incorporating caramel, creme, truffle and mousse (aerated) fillings in a dark chocolate shell has also been on the rise. However, it has not heretofore been possible, or at least not the practice in the art, to utilize a one-shot depositor to manufacture a dark chocolate confectionery with a caramel or other center-fill material. This may be due to difficulties arising from the relative density of dark chocolate and center-fill materials mentioned above, as well as the yield value of dark chocolate being lower as compared to milk chocolate.

Thus, there continues to be a need in the art for methods and apparatus for molding center-filled chocolate confectionery products utilizing a one-shot depositor which avoid the appearance of defects in the finished products. In particular, there is a need for methods and apparatus that will allow for efficient one-shot manufacture of center-filled dark chocolate confectionery products, such as caramel-filled dark chocolate.

SUMMARY OF THE INVENTION

The method of making a molded chocolate containing a confectionery-fill material according to the invention comprises: depositing chocolate and a confectionery-fill material in a mold; contacting an exposed surface of the chocolate with a directed stream of gas to remove air bubbles; and cooling the chocolate to obtain a molded chocolate with a confectionery-fill material. Preferably the confectionery-fill material is a center-fill material.

The system for performing the method according to the invention comprises: a mold tray; a mold tray conveyor; a depositor; a cooler; and an air knife positioned between the depositor and the cooler.

In preferred embodiments, chocolate and fill material are deposited substantially simultaneously with, for example, a conventional one-shot depositor, having concentric nozzles. In preferred embodiments, the cooler comprises a cooling tunnel, and the mold tray conveyor conveys the mold trays from the depositor, past the air knife, and through the cooling tunnel in a continuous manner.

In a further aspect, the invention is a one-shot deposited dark chocolate confectionery having a flat bottom surface substantially free of air bubble defects and a center-fill material. In preferred embodiments, the center-fill material is liquid when deposited, such as a caramel, creme, truffle or mousse filling. The one-shot deposited dark chocolate confectionery may be identified by characteristic tailing, or other indicia of one-shot depositing.

DETAILED DESCRIPTION OF THE INVENTION

Figure 1:
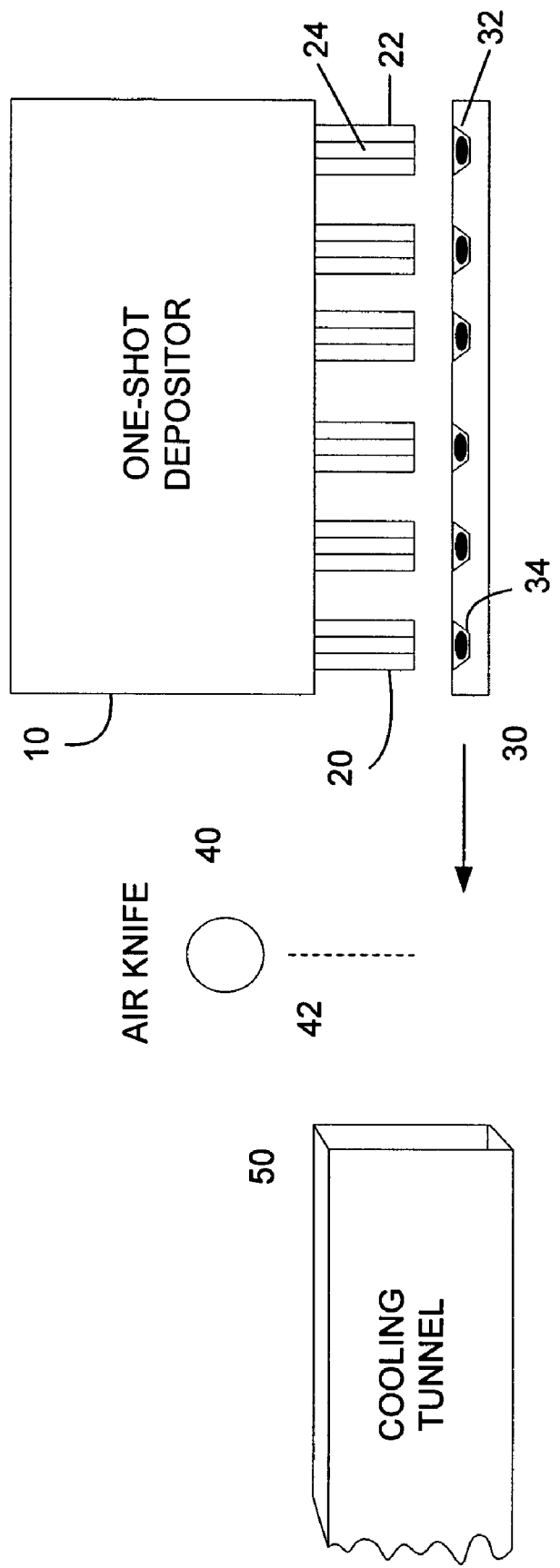
FIG. 1 schematically depicts elements according to an embodiment of the invention, including a one-shot depositor, an air knife and a cooling tunnel.

The method of this invention requires that chocolate and a confectionery-fill material be deposited into a mold. The mold may be any standard mold used in the industry. The method also encompasses one shot depositing as well as the formation of a shell of chocolate using shell molding or frozen cone molding followed by the deposit of confectionery-fill material and chocolate. In a preferred embodiment of the invention the deposit of chocolate and confectionery-fill material is made with a "one-shot depositor."

"One-shot deposited" and "one-shot depositor," as used herein, refers to any configuration of depositor having a nozzle that allows for chocolate shell material to be deposited through the same nozzle as center material. Typically, a one-shot depositor comprises a first conduit for depositing a center-fill material, and one or more annular conduits concentrically arranged around the first conduit for depositing chocolate shell material and additional center-fill material, as the case may be. A plurality of annular conduits in a concentric arrangement may provide for simultaneous deposition of a plurality of center-fill materials, and these are also referred to herein as "one-shot" depositors. A description of one-shot depositors and one-shot deposition is found, for example, in Whetstone, "Moulds and Moulding: Examples and Techniques, 50th *PMCA Production Conference*, (1996) pp. 102-103, which is incorporated by reference. Other nozzles adapted for codeposition of chocolate and center-fill material are known or may become available.

The term "chocolate" is intended to refer to all chocolate or chocolate-like compositions with a fat phase or fat-like composition. In the United States, chocolate is subject to a standard of identity established by the U.S. Food and Drug Administration (FDA) under the Federal Food, Drug and Cosmetic Act. As used herein, the term "chocolate" is intended to include chocolates with compositions conforming to the U.S. Standards Of Identity and compositions not conforming to the U.S. Standards Of Identity, including dark chocolate, baking chocolate, milk chocolate, sweet chocolate, semi-sweet chocolate, buttermilk chocolate, skim-milk chocolate, mixed dairy product chocolate, low fat chocolate, white chocolate, aerated chocolates, compound coatings, and chocolate-like compositions, unless specifically identified otherwise, provided that the chocolate can be deposited and molded.

Chocolate usually contains cocoa butter, chocolate liquor, sugar or other nutritive carbohydrate sweetener and an emulsifier such as lecithin. Chocolate may also contain milk or milk fat. Nonstandard chocolates result when, for example, the nutritive carbohydrate sweetener is replaced partially or completely; or when the cocoa butter or milk fat are replaced partially or completely; or when components that have flavors that imitate milk, butter or chocolate are added or other additions or deletions in formula are made outside the FDA standards of identify of chocolate or combinations thereof.

The term "chocolate-like compositions" refers to chocolate flavored compositions containing solid particles dispersed in a fat or fat-like phase.

The fat phase of the chocolate of the present invention can include cocoa butter, milk fat, anhydrous milk fat, butter oil, hydrogenated or partially hydrogenated vegetable oils or fats (fractionated or unfractionated) and other fats or mixtures of cocoa butter with these other fats. See Minifie, *Chocolate, Cocoa and Confectionery Science and Technology* 3rd Ed. pages 100-109.

The chocolate used as the chocolate shell material according to the present invention may have a density in a range of about 0.6 to about 1.38 g/cc. Preferably the chocolate shell material has a fat content in a range of about 20 percent by weight to about 40 percent by weight, and (as a liquid) has a density in a range of about 1.20 g/cc to about 1.38 g/cc.

Whereas milk chocolate generally contains milk solids, dark chocolate generally does not. Dark chocolate is somewhat less dense and has a lower yield value than milk chocolate. Consequently it poses a particular challenge to make a one-shot molded product with dark chocolate as the shell material.

As used herein "confectionery-fill material" is confectionery other than the chocolate being added to the mold. The confectionery-fill material may be inclusions, e.g., sugar shelled candies, that are visible at a surface of the chocolate product being manufactured by the method of this invention, but is preferably a center-fill confectionery material that is not visible on the surface of the chocolate confection.

Center-fill material as used herein includes, without limitation, caramel, crème, mousse, and truffle, all of which are fat-based confectionery materials with compositions well known in the art. The fat content of a fat based center-fill material may be in a range of 1 percent by weight to about 99 percent by weight. In embodiments, a liquid center-fill material may have a fat content in a range of about 10 percent by weight to about 60 percent by weight, and a density in a range of about 0.6 g/cc to about 1.36 g/cc, preferably in a range of about 0.9 g/cc to about 1.36 g/cc, more preferably in a range of 1.12 g/cc to about 1.36 g/cc, and still more preferably in a range of about 1.24 g/cc to about 1.36 g/cc. Other examples of center-fill material include liqueur, peanut butter paste and fondants.

In preferred embodiments, the liquid density of the center-fill material differs from the liquid density of the chocolate by at least about 0.005 g/cc, preferably the density difference between the center-fill material and the chocolate is greater than about 0.01 g/cc, more preferably the density difference is greater than about 0.025 g/cc, and still more preferably the density difference is greater than about 0.05 g/cc. While the preferred center-fill material is liquid as deposited, the center-fill material may be solid inclusions, such as (without limitation) crisps, sugar shelled candies or nuts. These solids are generally less dense than the liquid center-fill materials.

A preferred center-fill material is caramel, which presents a particular challenge with respect to one-shot depositing, because it is more dense than either milk chocolate or dark chocolate. Caramel recipes typically contain corn syrup, one or more fats, one or more sugars, oil, milk, and emulsifier, as well as other flavors and additives. Conventional caramel recipes may be adapted for use with the one-shot device, as would be recognized by one of ordinary skill in the art. The density of caramel may be about 1.27 g/cc and the density of the dark chocolate may be about 1.22 g/cc. Although the density of these materials is similar in a broad sense, the small difference has been found to be quite significant. It is especially in these instances where there is a density differential that the use of the air knife is expected to improve the process of making one-shot deposited center-filled materials.

In the course of practicing the invention, the mold tray is mechanically conveyed between a depositing zone where chocolate and fill material are codeposited into the mold cavities, and a cooling zone where the chocolate sets and hardens. An air knife zone is situated between the depositing zone and the cooling zone.

Referring to FIG. 1, wherein the elements according to an embodiment of the invention are depicted schematically, one shot depositor apparatus 10 comprises a plurality of nozzles 20, each having a central nozzle 24 and a concentric annular nozzle 22. Liquid material 32 is deposited into the respective mold cavities 34 of the mold tray 30. The conveyor (not shown), thereafter transports the mold trays past air knife 40, where a directed stream of gas 42 is directed at the exposed surface of the chocolate pieces in the mold cavities 34. Thereafter the molded chocolate confectionery products are cooled. Typically, in a continuous process, cooling is done in a cooling tunnel 50.

In the depositing zone, chocolate shell material and center-fill material are substantially simultaneously deposited, typically using a conventional one-shot depositor. The size of the nozzles of such devices is not particularly limited and may range between about 0.80 mm$^2$ up to about 180 mm$^2$.

A center-filled molded piece may have a mass of about 2 to about 400 grams, or even larger. Typically, larger pieces are made up of multiple segments connected together. In preferred embodiments, the size of a one-shot deposited piece, or a single segment of a larger piece, is in the range of about 4 to about 10 grams. In examples described herein, the pieces had a mass of about 8 grams. The center-fill may comprise about 5 to about 80 percent by weight of the confectionery piece; preferably, about 30 percent by weight to about 50 percent by weight of the center-filled molded chocolate confectionery is center-fill material. The deposit may be made with a single deposit into the mold or, particularly if the bar is segmented, then the deposit may be made by laying down a ribbon or strip of chocolate and confectionery-fill material. A segmented bar can also be made by single deposits of confectionery-fill material into each segment.

After the chocolate shell and center-fill material are deposited, the trays may be vibrated. In general, however, it is desired to minimize the amount of vibration to prevent the formation of defects. In this context, a lower yield value may be associated with a greater incidence of defects, as the motion expresses bubbles to the surface.

It is common practice in molding solid chocolates to use vibration to overcome the yield value of chocolate, thereby helping to expel air bubbles through the exposed surface of the chocolate. Alternatively, it is also known to use an emulsifier, such as polyglycerol polyricinoleate (PGPR), to lower the yield value of chocolate to aid in expelling bubbles. However, in the case of one-shot deposited chocolate confections, it is desired to minimize vibration, because of the risk of unwanted movement of the center with respect to the chocolate. Thus, PGPR would not be expected to be used, because it lowers the yield value, and further increases the risk of unwanted movement. Milk chocolate (without added PGPR) typically has a yield value in a range of about 120 dynes/cm$^2$ to about 250 dynes/cm$^2$. Dark chocolate (without added PGPR) typically has a yield value of 90 dynes/cm$^2$ to about 150 dynes/cm$^2$. This difference may account, at least in part, for the increased difficulty encountered in making a one-shot deposited chocolate with dark chocolate shell material. Surprisingly, the inventors have found that lowering the yield value of the chocolate through the use of PGPR in a co-deposited chocolate confection can increase the effectiveness of the air knife. In embodiments, PGPR is added in a range of up to about 0.3 percent by weight, with respect to the chocolate in the recipe, preferably in a range of about 0.1 to about 0.2 percent by weight. This obtains a yield value of the chocolate being contacted with the gas stream in a range of about 0 dynes/cm$^2$ to about 100 dynes/cm$^2$, preferably in a range of about 30 dynes/cm$^2$ to about 80 dynes/cm$^2$.

Chocolate shell material used in accordance with the invention may also be used without addition of PGPR emulsifier. Chocolate without the additional PGPR may have a yield value up to about 250 dynes/cm$^2$.

After the depositing step, the filled trays are transported to the air knife zone where a directed stream of gas impinges on the exposed surfaces of the chocolate. An "air knife" is a source of a directed stream of gas, which is not necessarily air (nitrogen or other gas could be used). The gas impinges on the exposed surface of the chocolate in the mold cavity to remove air bubbles and create a smooth surface. An air knife, as would be understood by one of ordinary skill in the art, generally comprises a hollow body, a fan to accelerate gas through the body, and an aperture in the body through which the gas stream passes. In embodiments, the aperture of the air knife is elongated and arranged perpendicularly to the direction of travel of the mold tray. In embodiments, the aperture of the air knife is an elongated slot having a width of about 1 to about 10 mm, preferably about 4 mm to about 6 mm. In embodiments, one or more apertures may extend across the width of the tray, contacting all of the confectionery pieces with a stream of gas by the time the mold tray passes underneath the air knife. The size of the air knife aperture, and consequently the size of the stream of gas directed at the surface of the chocolate, may be smaller or larger than the area of the exposed surface of the chocolate. Preferably, the length of the aperture is at least as long as a dimension of the surface which is being treated.

Mold trays may be made from polycarbonate or other suitable material as may be practiced in the art. The number of mold cavities per tray is not particularly limited except by practicality, and mold trays having several dozen mold cavities are typical. The mold tray conveyor preferably transports the trays through the system at a rate of about 10 to about 18 trays per minute. However, this parameter may also be varied by the ordinarily skilled artisan.

In preferred embodiments, the air knife is located in an air knife zone positioned at the entrance to the cooling tunnel. In this case, the air knife zone may be enclosed in the same enclosure as the cooling tunnel, and the gas in the air knife is ambient air obtained in the vicinity of the air knife. Preferably, the air in the air knife zone is filtered and has controlled relative humidity. The temperature in the air knife zone, from which ambient air is drawn to be directed at the chocolate, is preferably at or below the temperature of the chocolate (i.e., at a temperature in the range of about 28° C. to about 32° C., or lower). The temperature can be slightly higher, for example 32° C. to 35° C., provided the air flow does not detemper the surface of the chocolate. By the same token, the air (or other gas) in the air knife zone is preferably not as cold as the air in the cooling tunnel zone (i.e., farther into the cooling tunnel), so as not to set the chocolate before the air bubbles are removed and so as not to deleteriously affect the process of setting and hardening the chocolate.

It is also within the scope of the invention to position the air knife in an air knife zone outside the cooling tunnel. It may be desirable to provide an air filter and/or an air conditioner to provide conditioned air to the air knife, separately from the air supplied to the cooling tunnel.

The fan may be single speed, or is preferably adjustable. Preferably, the flow rate of air in the air knife will be in a range of about 4.6 m$^3$/min to about 6.8 m$^3$/min. The velocity of the gas at the aperture is in a range of about 2.5 m/s to about 50 m/s, preferably about 15 m/s to about 40 m/s. The velocity of the directed stream of gas, and the force with which the stream strikes the chocolate, must not be so great as to displace chocolate out of the mold cavity or cause permanent deformation or marks on the chocolate.

The air knife is located above the tray. Preferably, the air knife is positioned at a distance greater than 1 mm from the top of the tray, more preferably in a range of about 10 mm to about 330 mm from the top surface of the tray, and still more preferably in a range of about 25 mm to about 40 mm above the tray. The air knife may be positioned on a movable mounting so that the height and position of the air knife with respect to the mold tray is adjustable. The optimal distance to the tray may depend on the yield value of the chocolate, the velocity of the gas in the air knife, and other factors. The air knife may be stationary or movable. For example the air knife could sweep the tray or oscillate over the tray, as desired.

It is contemplated that more than one air knife may be used in combination. It may be also desirable to change the angle at which the directed stream of gas issuing from the aperture impinges on the chocolate. In embodiments, the aperture is positioned perpendicularly with respect to the horizontal top of the mold tray. However, it may be desirable to use a different angle, anywhere in the range of 90 degrees to any angle greater than 0 degrees, measured with respect to the top surface of the mold tray, in the direction of travel of the mold tray or opposite the direction of travel of the mold tray. Preferably the angle is in a range of 90 to 30 degrees, more preferably, 90 to 60 degrees, measured with respect to the exposed surface of the chocolate being contacted by the directed stream of gas.

One of ordinary skill in the art will understand that the force with which the directed stream of gas from the air knife impinges on the chocolate depends on a number of factors, including the dimensions of the mold cavity, the flow rate of the gas, the velocity of the gas leaving the air knife aperture, the distance between the air knife and the mold tray, the angle at which the gas impinges and the consistency of the chocolate. The force with which the stream of gas impinges on the chocolate should not displace or remove the chocolate from the mold cavities.

After the chocolate and confectionery-fill material have been deposited, and the exposed surface of the chocolate has been contacted by the directed stream of gas, the chocolate should be cooled. As used herein the "bottom surface" of the chocolate is the exposed surface that is contacted by the directed stream of gas. Typically, the mold trays are conveyed through a cooling tunnel. Alternatively, however, the trays may be placed in a cooling chamber.

EXAMPLES

Comparative Example

One-shot molded confectionery products were made using dark chocolate having a caramel filling with minimal vibration of the trays after filling, without utilizing an air knife.

Dove® Dark chocolate, having a density of 1.22 g/cc was used. PGPR was added to obtain a yield value (as deposited) of about 52 dynes/cm$^2$. The chocolate was co-deposited with caramel in pillow shaped molds. Caramel center-fill accounted for 30 to 35 percent by weight of the co-deposited product.

The depositor was a concentrically arranged one-shot depositor having an inner (caramel) nozzle diameter of 5 mm and an outer (chocolate) nozzle diameter of 11 mm. The distance from the nozzle to the top of the mold tray was 10 mm. The jacketing for the chocolate was maintained at 32° C., and the jacketing for the caramel was maintained at 30° C. Approximately 15 mold trays per minute were conveyed through the apparatus. Cooling was conducted in a cooling tunnel at a temperature of 17-18.5° C.

Each sample consists of 50 randomly selected foiled pieces, collected at different times during the trial. Each piece was examined after 24 hours. The finished pieces were tested for quality according to the following criteria:

If a product had at least one pinhole on any surface, it was scored for microbubbles.

If an air hole with diameter greater than 1-1.5 mm was observed, normally on the bottom of molded piece, it was scored for macrobubbles.

If caramel was observed seeping from product it was scored as a "leaker". The data are represented in Table 1, where "defect percentage" is the percentage of the sample in which the defect was found.

TABLE 1

Without Air Knife Defect Percentage

| Sample | Caramel Leakers (%) | Macrobubbles (%) | Microbubbles (%) |
|---|---|---|---|
| 1 | 0 | 10 | 8 |
| 2 | 0 | 18 | 6 |
| 3 | 0 | 32 | 4 |
| 4 | 0 | 32 | 4 |
| 5 | 2 | 48 | 0 |
| 6 | 2 | 32 | 0 |
| 7 | 16 | 50 | 0 |
| 8 | 2 | 42 | 4 |
| 9 | 2 | 68 | 2 |
| 10 | 2 | 70 | 2 |
| 11 | 8 | 60 | 0 |

Inventive Example

A similar trial was conducted using Dove® Dark chocolate again using minimal vibration and again using about 0.2 percent by weight PGPR emulsifier so that the yield value was about 52 dynes/cm$^2$. However, in the example according to the invention, an air knife was interposed between the depositor and the cooling tunnel, placed at the entrance of the cooling tunnel.

The air knife used was constructed of an aluminum tube, 5 inches in diameter and 28 inches long. The aperture was about ⅛ inch wide, extending about the length of the tube, positioned about 25 mm from the top surface of the mold tray. Defects were scored as in the Comparative Example, and the data are set forth in Table 2.

TABLE 2

With Air Knife

| Sample | Caramel Leakers (%) | Macrobubbles (%) | Microbubbles (%) |
|---|---|---|---|
| 1 | 0 | 0 | 2 |
| 2 | 0 | 0 | 0 |
| 3 | 0 | 0 | 10 |
| 4 | 0 | 0 | 24 |
| 5 | 4 | 6 | 16 |
| 6 | 2 | 2 | 2 |
| 7 | 6 | 2 | 8 |
| 8 | 6 | 6 | 8 |
| 9 | 0 | 0 | 12 |
| 10 | 4 | 0 | 8 |
| 11 | 0 | 12 | 4 |

From the foregoing it can be noted that there was a significant reduction in the incidence of macrobubbles in the one-shot molded chocolate confectionery products made according to the invention. There was also an apparent improvement in leakers. The small increase in microbubble percentage noted in the inventive example is not considered to be significant, particularly as this defect is not believed to be affected by the air knife.

What is claimed is:

1. A system for making a molded chocolate confectionery comprising a chocolate shell material and a confectionery center-fill material, comprising:
   a mold tray having a plurality of cavities;
   a liquid depositor adapted to deposit simultaneously a chocolate shell material and a confectionery center-fill material;

a cooling tunnel; and an air knife positioned above the mold tray; and a mold tray conveyor adapted to move the mold tray sequentially from the depositor, underneath the air knife and through the cooling tunnel; wherein each cavity in the mold tray exposes a surface of chocolate shell material to a directed stream of gas from the air knife to remove air bubbles from the confectionery as the mold tray moves underneath the air knife.

2. The system according to claim 1, wherein the air knife comprises a hollow element positioned above the mold tray, having an elongated aperture and a fan for accelerating gas through the hollow element and through the elongated aperture toward the mold tray.

3. The system according to claim 2, wherein the air knife comprises an adjustable fan producing an air velocity at the aperture in a range of about 2.5 m/s to about 50 m/s.

4. The system according to claim 1, wherein the depositor has a central conduit and one or more concentric annular conduits for co-depositing chocolate and center-fill materials.

5. The system according to claim 1, wherein the air knife is positioned on a movable mounting and the height of the air knife with respect to the mold tray is adjustable in a range of about 10 mm to about 330 mm.

6. The system according to claim 1, wherein the elongated aperture may be variably positioned to deliver a stream of gas at different angles with respect to the exposed surface of the chocolate.

* * * * *